Oct. 11, 1955  C. E. DYER  2,720,380
LOGGING BOOM
Filed Aug. 11, 1953  2 Sheets-Sheet 2
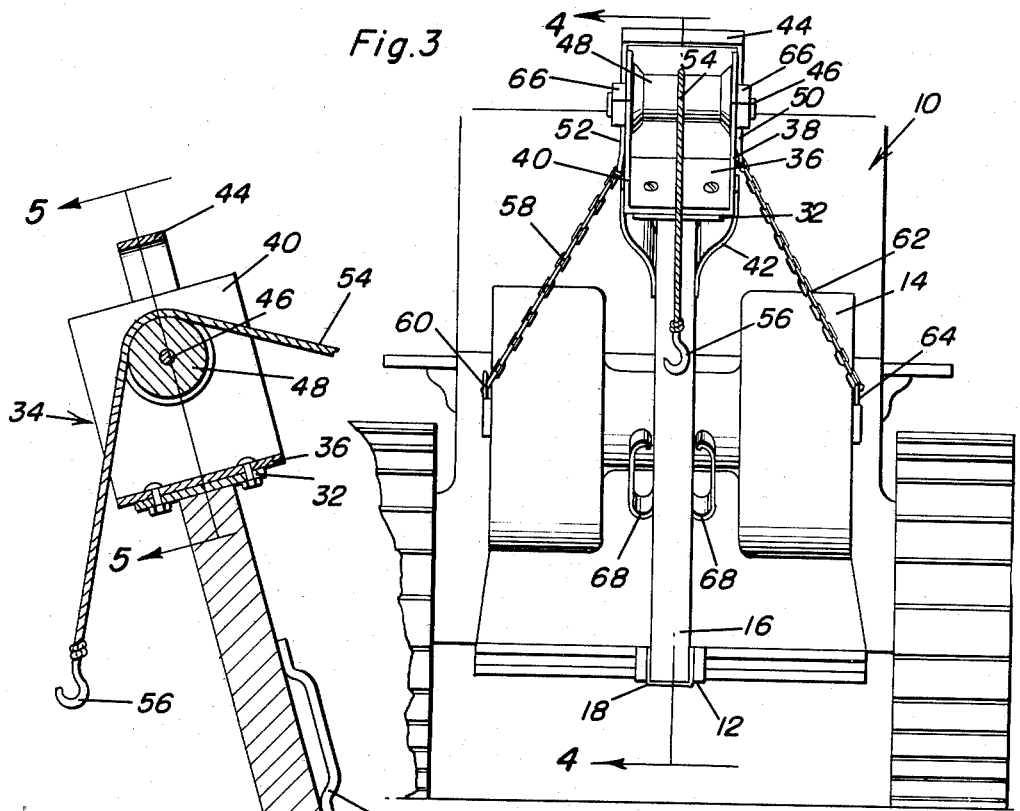
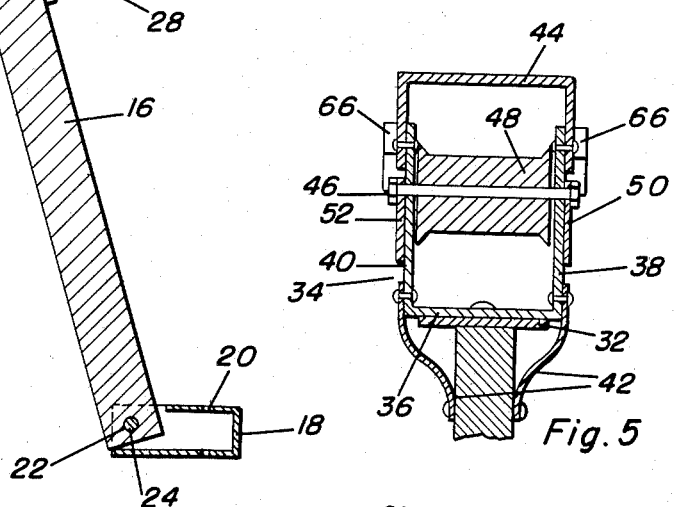
Charles E. Dyer
INVENTOR.

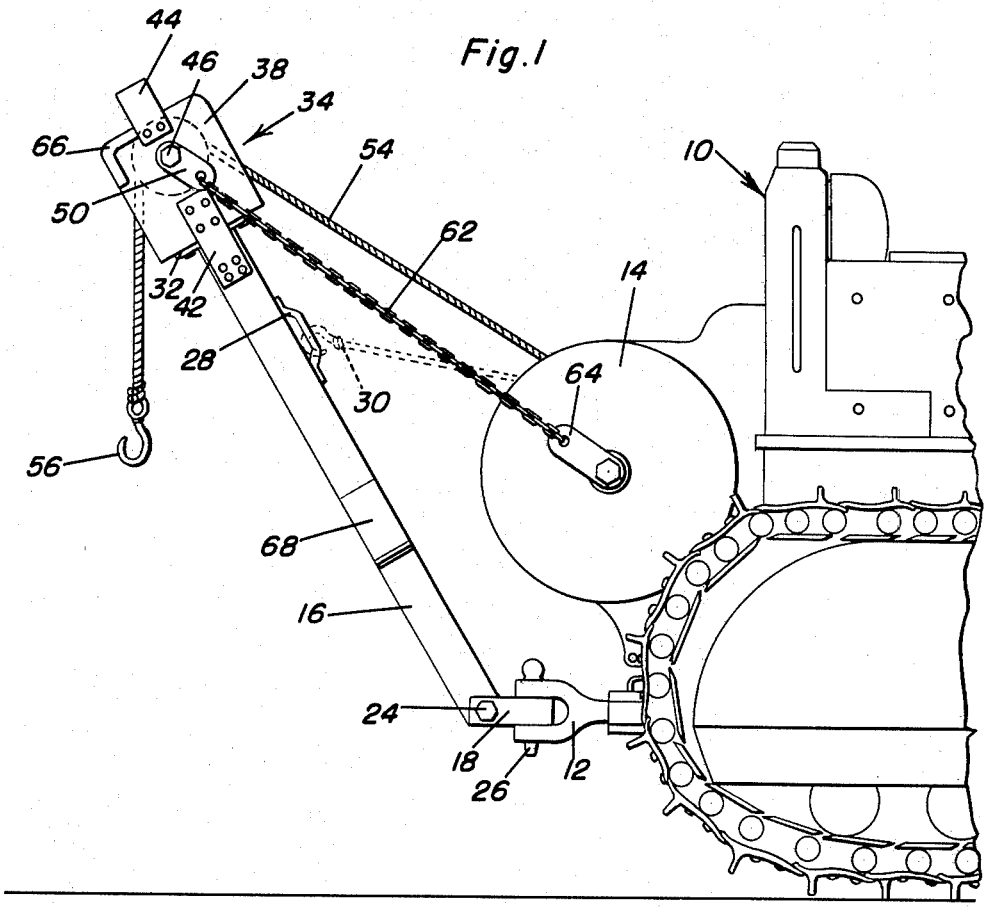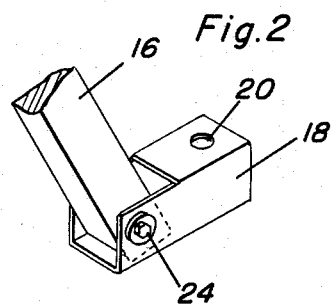

United States Patent Office 2,720,380
Patented Oct. 11, 1955

2,720,380

LOGGING BOOM

Charles E. Dyer, Seaside, Oreg.

Application August 11, 1953, Serial No. 373,591

2 Claims. (Cl. 254—139.1)

This invention relates to a logging boom and more specifically provides an improved boom attachment to be secured to a tractor having a drawbar and a power drum winch.

An object of this invention is to provide a logging boom which may be attached to a drawbar of a tractor and having a spool remote from said drawbar for receiving a log holding or lifting cable which is reeled in or out over the tractor power drum.

Another object of this invention is to provide means for raising and lowering a logging boom and further provided with means to secure said boom in a predetermined angular position.

An important object of this invention is to provide a logging boom having a guide spool at one end for receiving the cable log lifter and a guard over such spool to prevent displacement of the log lifting cable.

A further object of this invention is to provide means adjacent the spool of the log lifting boom to prevent the hook on the end of the log lifting cable from becoming secure to the spool mounting.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevation showing the logging boom attached to a tractor and the general details of the arrangement of the raising and lowering structure;

Figure 2 is a detailed perspective view of the attaching means for the inner end of the logging boom to the tractor drawbar;

Figure 3 is a rear end elevation taken from the lefthand side of Figure 1 showing the general structure of this invention;

Figure 4 is a longitudinal vertical section taken substantially along section line 4—4 of Figure 3 showing details of the logging boom and guide spool mounting; and, Figure 5 is a fragmental vertical section taken substantially along section line 5—5 of Figure 4 showing details of the guide spool mounting means and the guard for retaining the cable over the spool.

Referring now more specifically to Figures 1 and 3 in the drawings, it will be seen that the numeral 10 generally designates a tractor having a drawbar 12 and a power drum winch 14 and pivotally secured to the drawbar 12 is a boom 16 which in its normal position extends in a rearwardly and upwardly inclined direction from the drawbar 12.

As best seen in Figure 2, the boom 16 is mounted to the drawbar 12 by the use of a bracket 18 having an aperture 20 through a box-like section of bracket 18 and an aperture 22 and a pin 24 extending through the bracket 18 and the boom 16 for pivotally attaching the boom 16 to the bracket 18. A pin 26 is inserted into the aperture 20 and complementary apertures on the drawbar 12 for securing the bracket 18 to the drawbar.

Now looking at Figures 1, 3 and 4, the boom 16 is provided above its mid-point with a U-shaped bracket 28 for receiving a hook and cable 30 which is used to raise and lower the boom 16. Referring now more specifically to Figure 5, it will be seen that the boom 16 is provided at its upper end with a flat plate 32 and secured to the upper surface of plate 32 is a U-shaped member 34 having a bight portion 36 and upstanding leg portions 38 and 40. The leg portions 38 and 40 are braced to the boom 16 by offset braces 42 and the upper portions of the leg members 40 and 38 are connected by a U-shaped guard member 44 for a purpose described hereinafter. Adjacent the mid-point of legs 40 and 38 is an axle bolt 46 which rotatably supports a guide spool 48 between the leg members 40 and 38 and also rotatably supports bracket members 50 and 52 along side the outer surface of leg members 40 and 38.

Referring now more specifically to Figures 1, 3 and 4, it will be seen that the guide spool 48 receives a log lifting or handling cable 54 having a lifting hook 56 on one end thereof and being reeled about power drum 14 at its other end. Attached to the bracket 52 which is secured to the spool shaft 46 is a flexible chain which has a bracket 60 at its opposite end for attaching to an axle of the power drum 14 and the bracket 50 has a flexible chain 62 having a bracket at its opposite end 64 for attachment to the end of the axle of the winch drum 14. As best seen in Figures 1 and 5, buffer plates 66 are provided adjacent the upper and outer portions of leg members 38 and 40 to prevent the hook 56 from becoming entangled and attached to the spool mounting leg members. As best shown in Figure 3, the boom 16 is provided with a pair of hooks 68 for securing or supporting log chokers or slings (not shown), when the device is not being used.

The operation of the device will be readily understood. The boom 16 is attached to the tractor drawbar 12 by inserting the pin 26 through the aperture 20 in the bracket 18 and the pivot pin 24 will pivotally support the boom 16. The boom 16 is raised or lowered by cable and hook 30 attached to the U-shaped member 28 and it may be secured in a predetermined angular position by the use of chain members 58 and 62 attached at one end to the axle of the winch drum 14, and at the other end to the shaft or spindle 48. Secured to the upper end or outer end of the boom 16 is a U-shaped member 34 having legs 38 and 40 with a spindle 48 journaled therebetween on the shaft 46 and guided over this spindle 48 is a litfing cable 54 having a hook 56 to engage suitable log lifting or pulling means (not shown). Extending across the top of the leg members 40 and 38 is a U-shaped member 44 which acts as a closure and a guard to prevent the cable 54 from jumping off the spool or spindle 48, and buffer plates 66 are provided adjacent the outer and upper edge of plates 38 and 40 to prevent the hook 56 from becoming entangled in the leg members 38 and 40 when the hook is raised to its uppermost position. When the boom 16 is not in use, the log chokers or slings (not shown), may be conveniently supported in hook members 68 provided on the side of boom 16. This invention provides a light, sturdy, economical, and easily installed log boom which may be used for skidding or lifting logs and the ease of operation of the boom by the tractor operator is effectively facilitated by this invention. Obviously, this invention may be employed in many uses and may be attached to other type tractors than that shown in this specific embodiment as shown in the drawings.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A logging boom adapted to be attached to a tractor of the type having a power drum comprising an elongated boom member, means for pivotally attaching said boom to a tractor drawbar, a spool rotatably mounted on the outer end of said boom for receiving a log lifting cable, and means attached to each end of the spool mounting means for securing the outer end of the boom to the power drum axle.

2. A logging boom adapted to be attached to a tractor of the type having a power drum comprising an elongated boom member, means for pivotally attaching said boom to a tractor drawbar, a spool rotatably mounted on the outer end of said boom for receiving a log lifting cable, and means attached to each end of the spool mounting means for securing the outer end of the boom to the power drum axle, wherein said boom is provided with a pair of spaced apertured ears with a spool supporting axle extending between and through said ears, a pivotally mounted bracket on each end of said axle, means to secure said brackets to said axle, a chain attached to each bracket at one end and said chains being provided with bracket means for attachment to the axle of the power drum.

References Cited in the file of this patent

UNITED STATES PATENTS

| | | |
|---|---|---|
| 1,887,965 | Stoner | Nov. 15, 1932 |
| 1,996,458 | Clancy | Apr. 2, 1935 |
| 2,493,150 | Kroger | Jan. 3, 1950 |